(12) United States Patent  (10) Patent No.: US 7,331,184 B2
Lee  (45) Date of Patent: Feb. 19, 2008

(54) HOT-COLD CUSHION

(76) Inventor: Ching-Yang Lee, No. 12, Fu Kuei Hsin Tsuen, Alley 6, Heng Shan Tsuen, Heng Shang Hsiang, Hsin Chu Hsien (TW)

( * ) Notice: Subject to any disclaimer, the term of this patent is extended or adjusted under 35 U.S.C. 154(b) by 290 days.

(21) Appl. No.: 11/224,934

(22) Filed: Sep. 14, 2005

(65) Prior Publication Data
US 2007/0056294 A1 Mar. 15, 2007

(51) Int. Cl.
F25B 21/02 (2006.01)
(52) U.S. Cl. .............................. 62/3.5; 62/3.3; 62/261
(58) Field of Classification Search ................... 62/3.2, 62/3.3, 3.5, 3.7, 261
See application file for complete search history.

(56) References Cited

U.S. PATENT DOCUMENTS 5,687,573 A * 11/1997 Shih .............................. 62/3.6
5,918,469 A * 7/1999 Cardella ........................ 62/3.7
6,907,739 B2 * 6/2005 Bell .............................. 62/3.7

* cited by examiner

Primary Examiner—Melvin Jones
(74) Attorney, Agent, or Firm—Troxell Law Office, PLLC

(57) ABSTRACT

A hot-cold cushion includes a heat/cool device, a connecting tube and a cushion with circulating pipes. The heat/cool device composed of a thermo semiconductor chip, a thermoconductor, a fan, a heat dissipation member, a box with liquid, and a hydraulic pump is connected with circulating pipes inside the cushion by the connecting tube so as to form a circulation loop. By exchange of the positive/negative electrodes of direct current, the thermo semiconductor chip produces heat or cold that is circulated and dissipated by the heat/cool device so as to regulate the temperature of the cushion into a suitable range for human bodies. Therefore, the hot-cold cushion achieves better effect.

8 Claims, 5 Drawing Sheets

HOT-COLD CUSHION

BACKGROUND OF THE INVENTION

The present invention relates to a hot-cold cushion, especially to a device with a heat/cool device for regulating temperature of the cushion into a certain range suitable for human bodies that can be applied to various cushions such as car seats, camping mat, sleeping bag, mattress, cods, pillows, or mats for furniture.

Design of the hot-cold cushions disclosed in Taiwanese Utility Model publication No. 418787, Chinese Utility Model Patent No. ZL98248912.9, ZL00224803.4, ZL00243381.8, and Chinese Invention patent application No. 03104073.X (publication No. CN1522628A) got various problems such as large volume, lousy noise, complicated structure, difficulties in maintenance, disassembling or cleaning, especially with poor design in thermal conductivity or heat/cold dissipation. While cooling off, dew drops are generated and the speed of heating/cooling is quite slow so that it takes time to achieve the required temperature. Thus the prior arts don't match users requirements and can't be conveniently applied to car seats (including seat cushions and mats for seat back).

SUMMARY OF THE INVENTION

It is a primary object of the present invention to provide a hot-cold cushion having a heat/cool device, a connecting tube and a cushion with circulating pipes. The heat/cool device composed of a thermo semiconductor chip generating heat and cold, a thermoconductor, a fan, a heat dissipation member, a box with liquid, and a hydraulic pump works as an air cooling system. The heat/cool device is connected with the cushion by the connecting tube so as to form a circulation loop. By exchange of the positive/negative electrodes of direct current, the thermo semiconductor chip produces heat or cold to warm up or cool off. The heat or cold generated is circulated and dissipated by the heat/cool device so as to regulate the temperature of the cushion into a suitable range for human bodies. Therefore, the hot-cold cushion achieves better effect.

DETAILED DESCRIPTION OF THE PREFERRED EMBODIMENT

Figure 1:
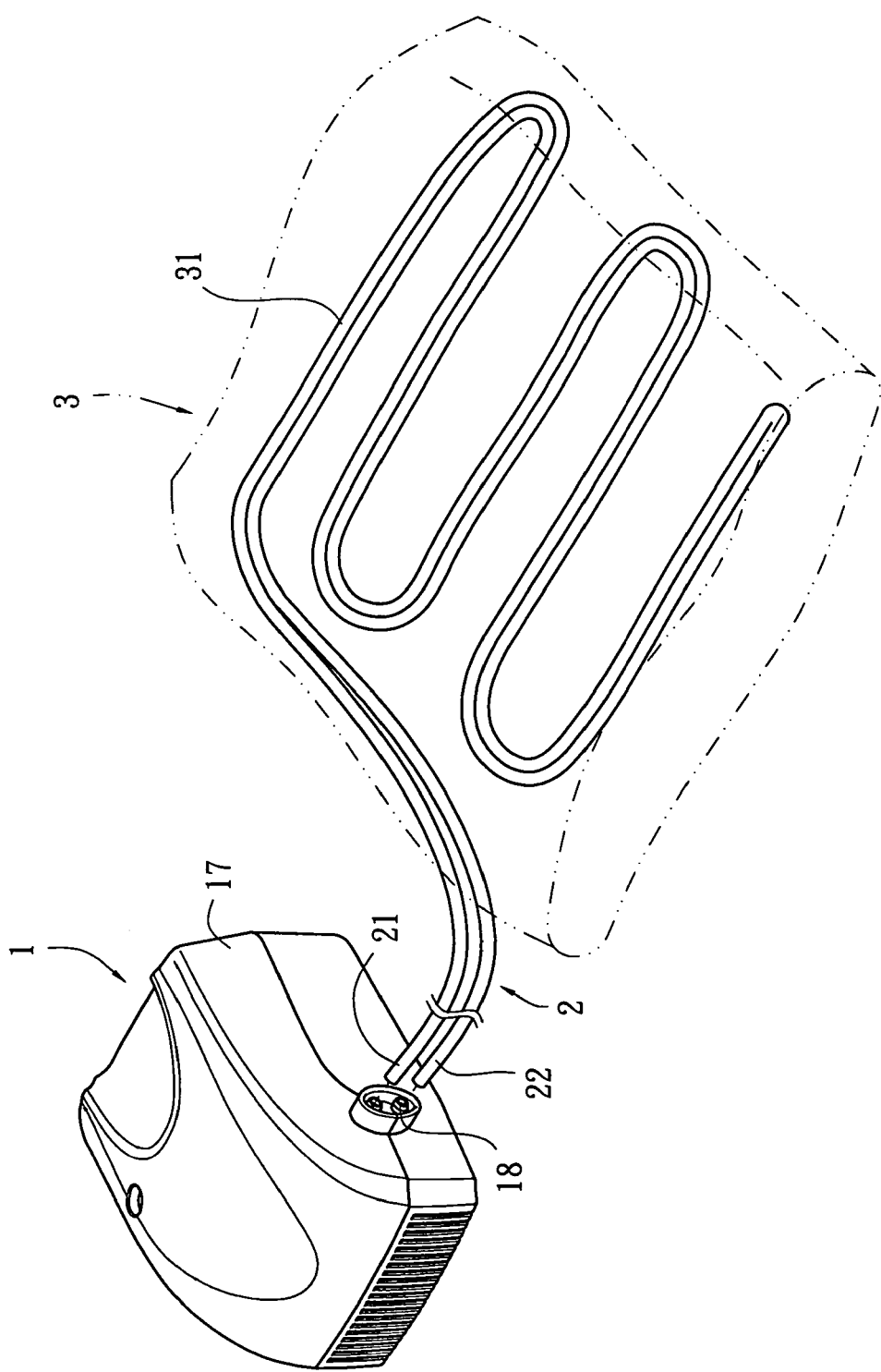
FIG. 1 is a perspective view of an embodiment in accordance with the present invention.
Figure 2:
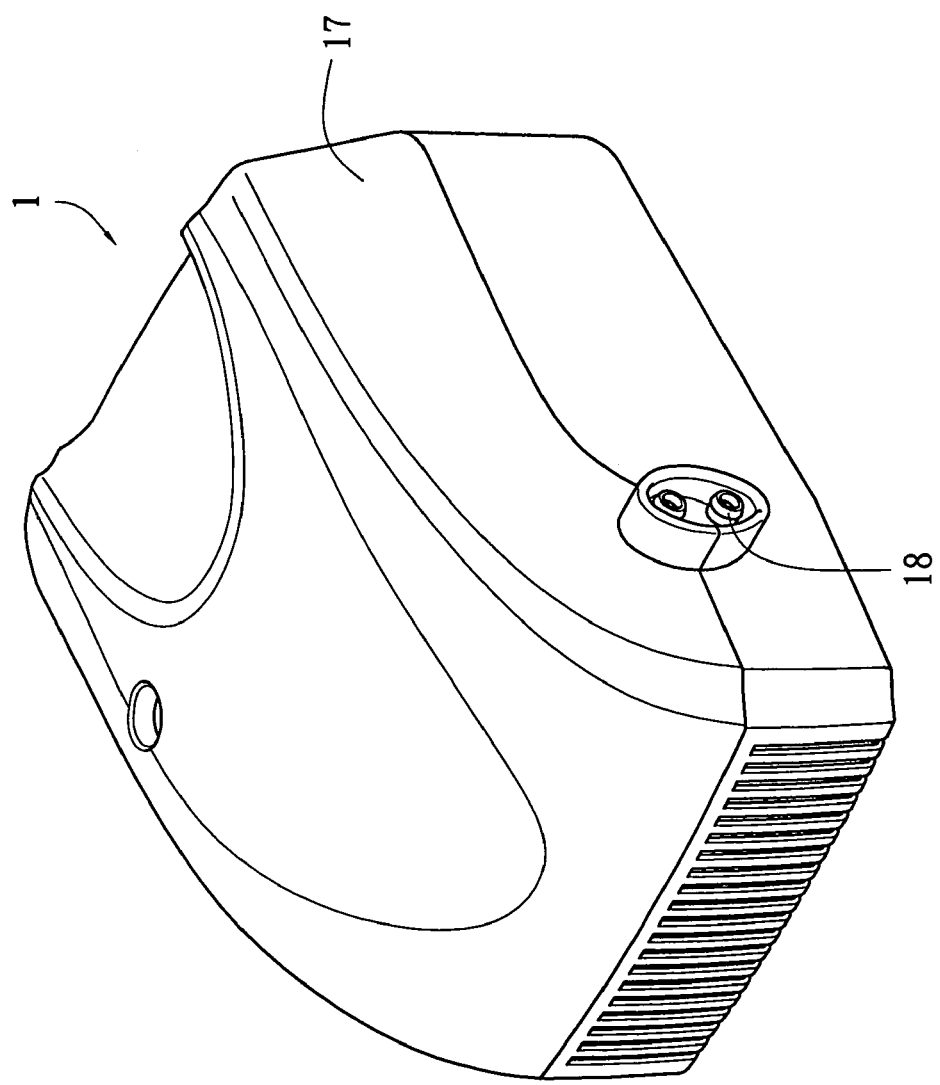
FIG. 2 is an enlarged view of a heat/cool device in FIG. 1 in accordance with the present invention.
Figure 3:
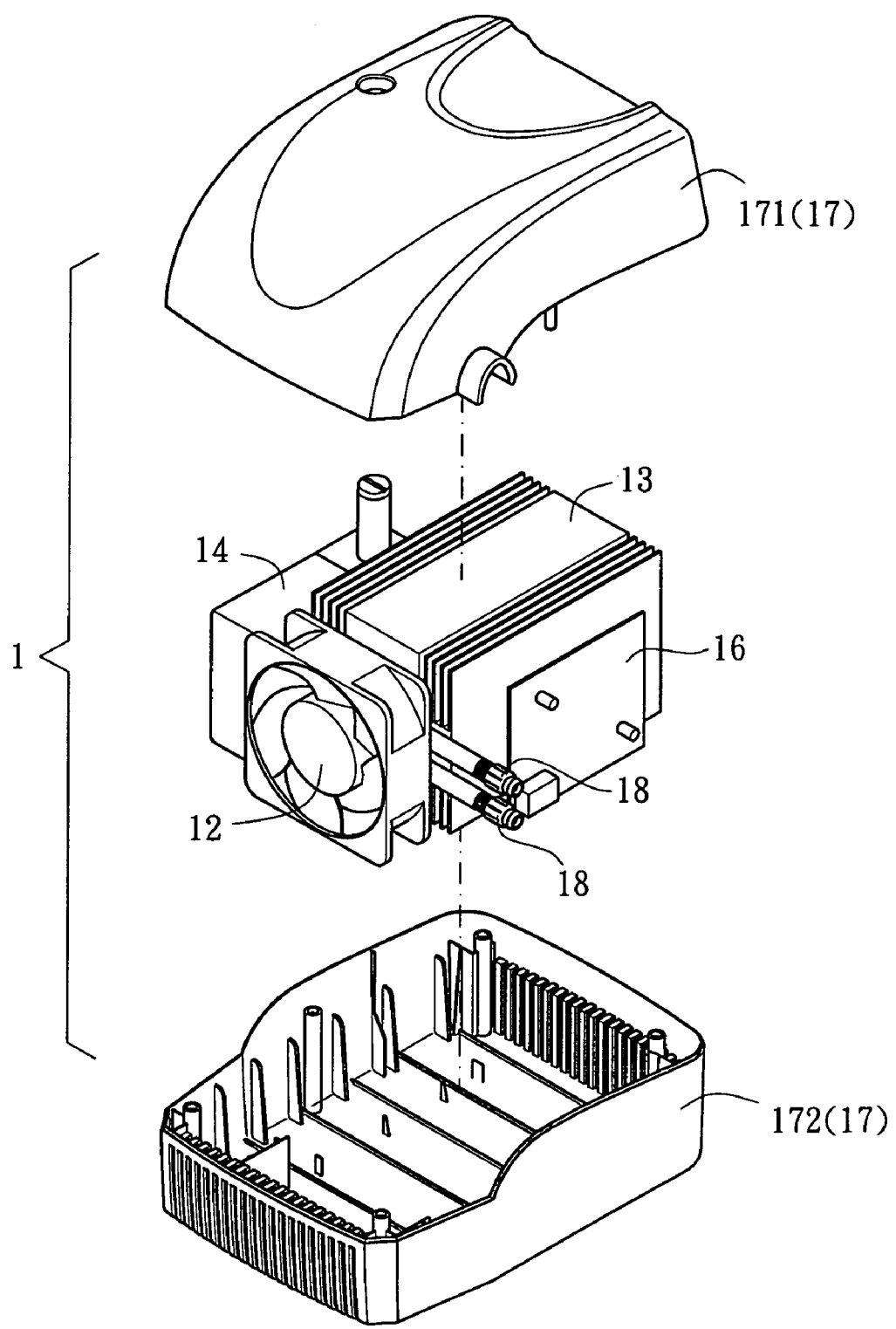
FIG. 3 is an explosive view of the heat/cool device in FIG. 1 in accordance with the present invention.
Figure 4:
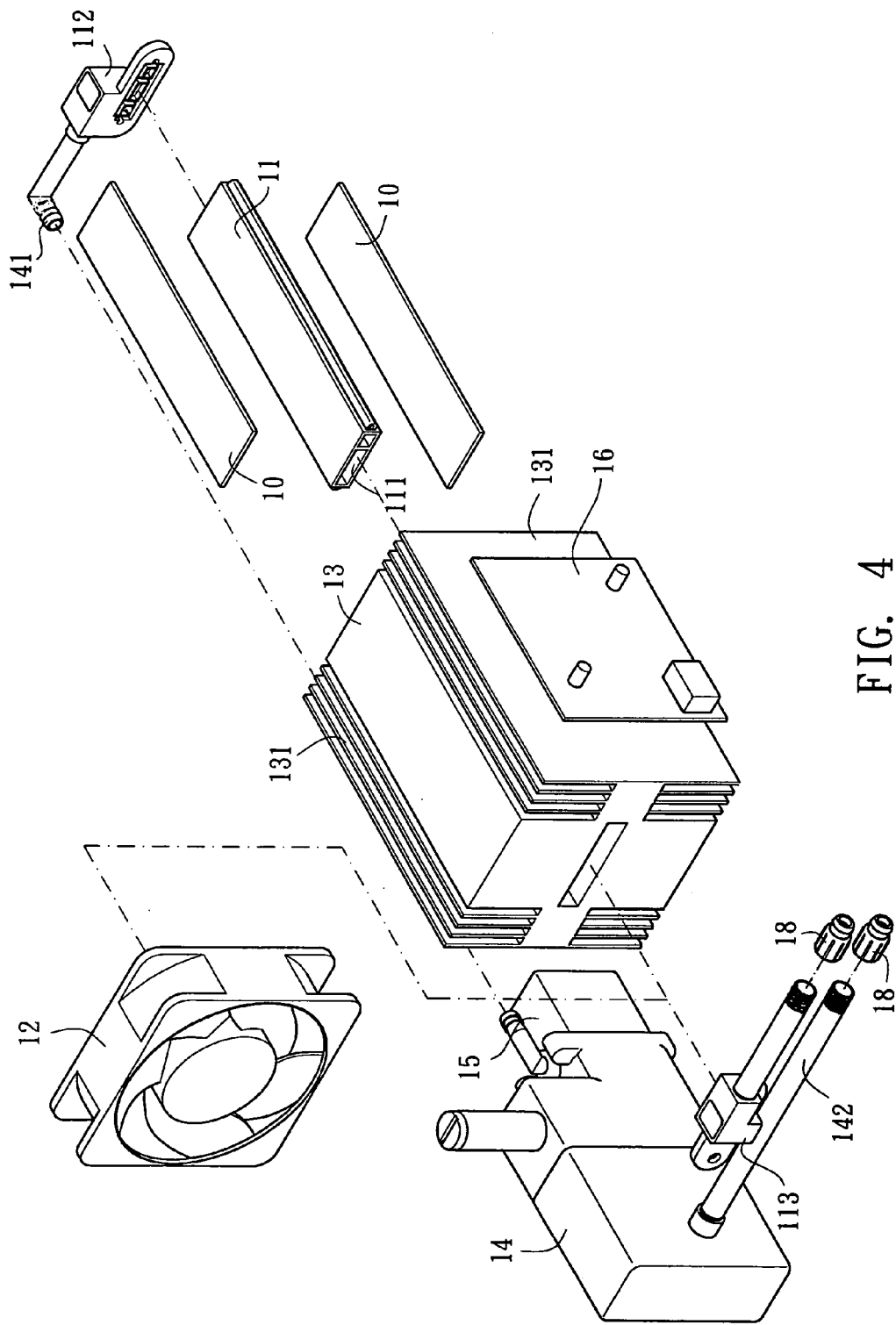
FIG. 4 is a detailed explosive view of the heat/cool device in FIG. 3 in accordance with the present invention.
Figure 5:
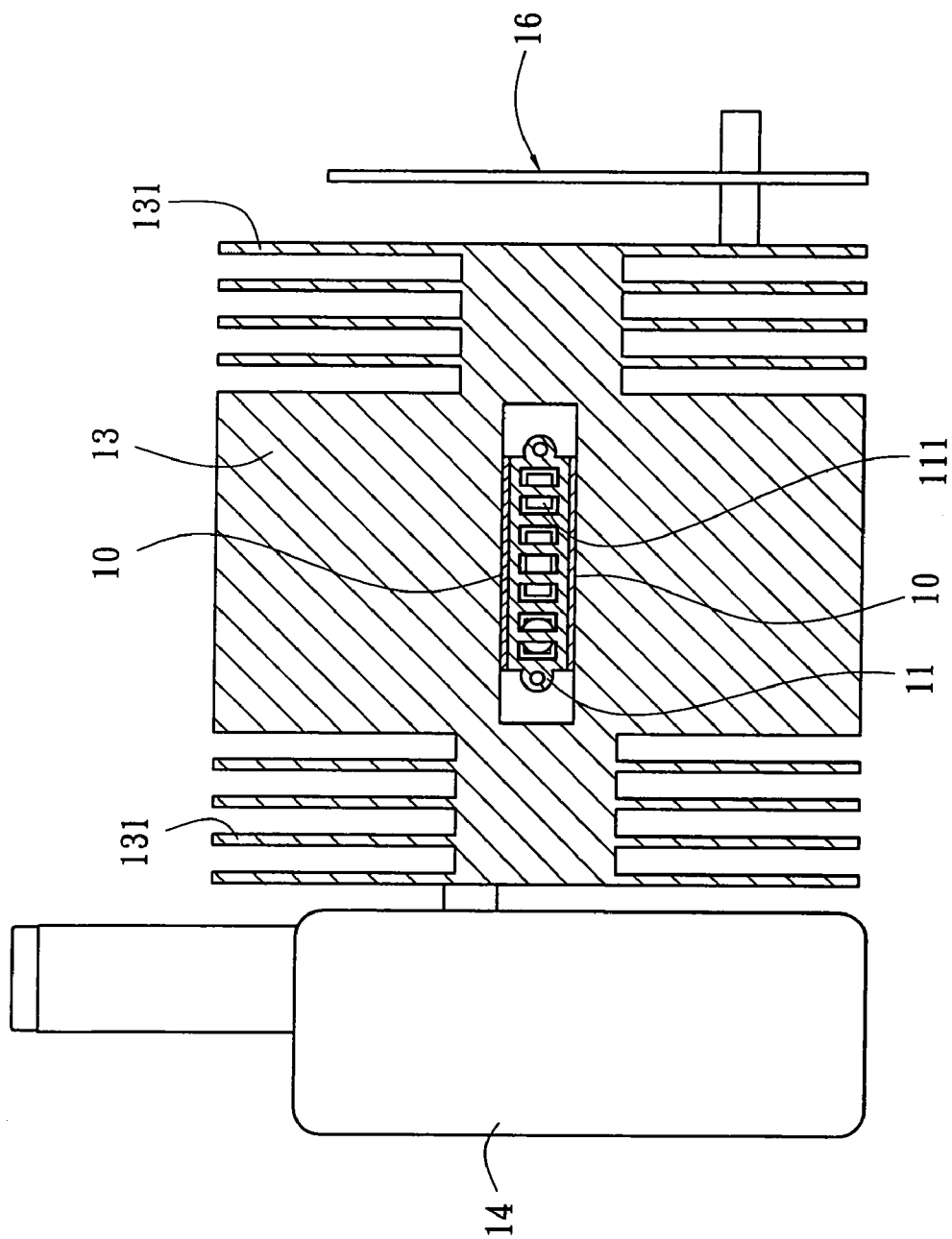
FIG. 5 is a cross sectional view of the heat/cool device in accordance with the present invention.

Refer to FIG. 1, a hot/cold cushion in accordance with the present invention includes a heat/cool device 1, a connecting tube 2 and a cushion 3. Refer from FIG. 2 to FIG. 4, the heat/cool device 1 consists of a thermo semiconductor chip 10 that can cool off and warm up, a thermoconductor 11, a fan 12, a heat dissipation member 13, a box with liquid 14, a hydraulic pump 15, and a circuit board 16, enclosed inside a housing 17 having an upper covering 171 and lower covering 172. The box with liquid 14, the hydraulic pump 15, and the thermoconductor 11 are connected with a circulating pipe 31 inside a cushion 3 in series by a connecting tube 2 so as to form a circulation loop. The disposition way of the circulating pipe 31 is not limited. The thermoconductor 11 is a metal tube with certain length with a plurality of channel for fluid 111 that connects with each other in series or in parallel. The thermo semiconductor chip 10 made by semiconductor is arranged on upper side as well as bottom side, along longitudinal axis of the thermoconductor 11 while the heat dissipation member 13 covers closely along longitudinal axis of the thermo semiconductor chip 10. A plurality of heat dissipation fin 131 is disposed on the heat dissipation member 13 in parallel. The fan 12 is installed on one side of the heat dissipation member 13 along the direction of the heat dissipation fin for providing wind flowing through gaps between two heat dissipation fins 131 so as to achieve cooling effect. The thermo semiconductor chip 10, the hydraulic pump 15, and the fan 12 are turned on and controlled by a direct current power source (not shown in figure) through the circuit board 16. Moreover, a temperature sensor (not shown in figure) connected with the circuit board 16 is arranged on the thermoconductor 11 so as to control the heat/cool device 1 for setting the temperature of the cushion 3 in a certain range.

The heat dissipation member 13 is made by at least one copper or aluminum block and a plurality of heat dissipation fins 131 is arranged on one side or two sides of the heat dissipation member 13, along longitudinal axis.

The connecting tube 2 can be an integrated double-wall tube or a tube with thermal insulation material.

A plurality of channel for fluid 111 is disposed inside the thermoconductor 11 and is connected with each other in series or in parallel. A water inlet 112 and a water outlet 113 are mounted on one side of the thermoconductor 11 or two sides thereof respectively so that the box with liquid 14 is sent out by the hydraulic pump 15, flowing into the channel for fluid 111 of thermoconductor 11 through the water inlet 112, and flowing out of the thermoconductor 11 through the water outlet 113.

The material for manufacturing the cushion 3 is not restricted, and can be water proof, oil repellent, magnetic therapeutic, rubbing, bacteria resistant, or infrared material, depending on users' needs. The cushion 3 can also be made by general foam. There is also no limits on the disposition of the circulating pipe 31 inside the cushion 3.

The circulating pipe 31 can be one or several soft tubes arranged as shown in FIG. 1. Moreover, while manufacturing the cushion 3 for car seats (including the seat cushion and seat back), the circulating pipe 31 is integrated with the cushion 3 by various ways such as foaming, heat fusion, attachment, adhesion, sewing and then connected with the connecting tube 2 for being used so as to increase convenience for usage.

A control panel or a controller (not shown in figure) for the circuit board 16 is disposed on the housing 17 for convenient operation of users. The control panel (or controller) having blue tooth devices for wire or wireless temperature control and display, infrared remote controllers, or manual switches for turning on, turning off, cooling, heating, temperature regulation, temperature display, or time switch. The functions of heating and cooling as well as power of the present invention can also be regulated by a knob or a position switch.

According to users' needs, the heat/cool device 1 can have only heat or cool function. For example, car seats for users in subtropical zone only have cool function so as to reduce manufacturing cost. The cushion 3 includes seat cushions, mattress, camping mat, chair cushions, waist support cushion or neck support cushion can be used in combination with seats or integrated with bedsteads, night tables, sofas, chair mats, car seats, seat back or neck part.

The heat/cool device 1 can be used in combination with a cushion 3 or a plurality of cushions 3 at the same time. The circulation loop consists of the box with liquid 14, the hydraulic pump 15, the thermoconductor 11, the connecting tube 2 and the circulating pipe 31 inside the cushion 3 has enough amount of liquid therein for circulation.

A temperature sensor (not shown in figure) is disposed on the present invention for measuring temperature of the liquid while the switch of the temperature sensor or switch for temperature regulation can be arranged on the thermoconductor 11, the heat dissipation member 13, the box with liquid 14, the connecting tube 2 or the circulating pipe 31 inside the cushion 3.

In usage, the liquid (thermal interface material such as water) is sent out of the box with liquid 14 by the hydraulic pump 15, flowing through a duct 141 and the water inlet 112 and then into the thermoconductor 11. While flowing inside the channel for fluid 111 of the thermoconductor 11, the heat /cold generated by the thermo semiconductor chip 10 is transmitted to the thermoconductor 11 and the liquid. After absorbing heat/cold inside the thermoconductor 11, the liquid flows through the water outlet 113, into a pipeline 21 and the circulating pipe 31, an then leaves the pipeline 21, returns into the box with liquid 14 through a duct 142. Thus a circulation loop is formed so as to regulate the temperature of the cushion 3.

In the heat/cool device 1, the heat generated from the thermo semiconductor chip 10 is exhausted by means of the fan 12 and the heat dissipation member 13 while cooling off. When warming up, the cold generated the thermo semiconductor chip 10 is also need to be discharged.

The connecting tube 2 can be an integrated double-wall soft tube or a tube with thermal insulation material for keeping temperature. While cooling off, there is no dew drop generated. Moreover, the connecting tube 2 consisting of access pipeline 21 and exit pipeline 22 is connected with the heat/cool device 1 by a nozzle 18.

In accordance with structure mentioned above, by exchange of the positive/negative electrodes of direct current, the thermo semiconductor chip 10 generates heat or cold while the thermoconductor 11, the fan 12, and the heat dissipation member 13 act like an air cooling system so as to increase heating/cooling speed and enhance heat/cold exchange. Thus the temperature of the cushion 3 is fast regulated into a certain range suitable for human bodies. Moreover, the heat/cool device 1 has simple structure, compact volume and convenient assembling/disassembling.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A hot-cold cushion comprising a heat/cool device, a connecting tube and a cushion, wherein the heat/cool device having a thermo semiconductor chip, a thermoconductor, a fan, a heat dissipation member, a box with liquid, and a hydraulic pump is connected with circulating pipes inside the cushion by the connecting tube while the box with liquid, the hydraulic pump, and the thermoconductor are connected with the cushion in series so as to form a circulation loop for liquid; thus the liquid is sent from the box with liquid by the hydraulic pump, entering the thermoconductor for absorbing heat or cold generated by the thermo semiconductor chip, then into the circulating pipes of the cushion and returns back to the box with liquid; top side as well as bottom side of the thermoconductor is disposed with a thermo semiconductor chip respectively while the heat dissipation member with heat dissipation fin encloses the thermo semiconductor chip and thermoconductor and the fan is fixed on one side of the heat dissipation member along the direction of the heat dissipation fin for providing winds to the heat dissipation member;

the connecting tube having an access pipeline and an exit pipeline is between the heat/cool device and the cushion and is connected with the heat/cool device and the cushion in series to form a liquid circulation loop; and the cushion with circulating pipes for connecting with the connecting tube.

2. The device as claimed in claim 1, wherein the thermoconductor is a metal tube with certain length and having a plurality of channel for fluid that connect with each other in series or in parallel.

3. The device as claimed in claim 1, wherein the heat dissipation member is made by at least one copper or aluminum block and a plurality of heat dissipation fins is arranged on one side or two sides thereof.

4. The device as claimed in claim 1, wherein the connecting tube is an integrated double-wall soft tube or a tube with thermal insulation material.

5. The device as claimed in claim 1, wherein there is no limits in the disposition of the circulating pipe inside the cushion and the circulating pipe is integrated with the cushion by foaming, heat fusion, attachment, adhesion, or sewing.

6. The device as claimed in claim 1, wherein the heat/cool device is a heat generating system or a cold generating system.

7. The device as claimed in claim 1, wherein the cushion is a seat cushion, car cushion, car seat back, mattress, camping mat, chair mats, waist support cushion or neck support cushion.

8. The device as claimed in claim 1, wherein the heat/cool device is connected with at least one cushion for usage.

* * * * *